United States Patent
Huotari

(10) Patent No.: US 9,229,615 B2
(45) Date of Patent: Jan. 5, 2016

(54) METHOD AND APPARATUS FOR DISPLAYING ADDITIONAL INFORMATION ITEMS

(75) Inventor: Vesa Tapani Huotari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 558 days.

(21) Appl. No.: 12/391,147

(22) Filed: Feb. 23, 2009

(65) Prior Publication Data

US 2010/0218144 A1 Aug. 26, 2010

(51) Int. Cl.
| | | |
|---|---|---|
| G06F 3/033 | (2013.01) | |
| G06F 3/0481 | (2013.01) | |
| G06F 3/0482 | (2013.01) | |
| G06F 3/0485 | (2013.01) | |
| G06F 3/0486 | (2013.01) | |
| G06F 3/0488 | (2013.01) | |
| G06F 17/30 | (2006.01) | |

(52) U.S. Cl.
CPC .......... G06F 3/04817 (2013.01); G06F 3/0482 (2013.01); G06F 3/0485 (2013.01); G06F 3/0486 (2013.01); G06F 3/04883 (2013.01); G06F 17/30277 (2013.01)

(58) Field of Classification Search
CPC .................................................. G06F 3/04817
USPC ........................ 715/860, 863, 800, 815, 702
See application file for complete search history.

(56) References Cited

U.S. PATENT DOCUMENTS

| 5,784,061 | A * | 7/1998 | Moran et al. .................. 715/863 |
| 5,805,167 | A * | 9/1998 | van Cruyningen ............ 715/808 |
| 6,377,285 | B1 * | 4/2002 | Doan et al. .................... 715/764 |
| 6,828,992 | B1 * | 12/2004 | Freeman et al. .............. 715/810 |
| 7,302,279 | B2 | 11/2007 | Olrik et al. |
| 7,469,381 | B2 * | 12/2008 | Ording ........................... 715/702 |
| 7,683,893 | B2 | 3/2010 | Kim |
| 2002/0135601 | A1 * | 9/2002 | Watanabe et al. .............. 345/660 |
| 2004/0021647 | A1 * | 2/2004 | Iwema et al. .................. 345/179 |
| 2004/0140956 | A1 * | 7/2004 | Kushler et al. ................ 345/168 |
| 2006/0117197 | A1 * | 6/2006 | Nurmi ............................ 713/323 |
| 2008/0040692 | A1 * | 2/2008 | Sunday et al. ................. 715/863 |
| 2008/0062207 | A1 * | 3/2008 | Park ............................... 345/684 |
| 2009/0094562 | A1 * | 4/2009 | Jeong et al. .................... 715/863 |
| 2009/0307188 | A1 * | 12/2009 | Oldham et al. .................... 707/3 |
| 2010/0083111 | A1 * | 4/2010 | de los Reyes ................. 715/702 |
| 2010/0218144 | A1 * | 8/2010 | Huotari ......................... 715/863 |

FOREIGN PATENT DOCUMENTS

| CN | 1726693 A | 1/2006 |
| CN | 1855021 A | 11/2006 |
| CN | 101226442 A | 7/2008 |
| EP | 1947554 A1 | 7/2008 |
| EP | 2166463 A1 | 3/2010 |
| WO | 2009022243 A1 | 2/2009 |

OTHER PUBLICATIONS

Labeled NPL Results.* Labeled Patent Results.*
International Search Report and Written Opinion of the International Searching Authority from corresponding Patent Cooperation Treaty Application No. PCT/IB2010/000339, dated Jun. 2, 2010, 15 pages.
Chinese Office Action and Translation received in Chinese Application No. 201080009028.1, dated Dec. 12, 2013, 8 pages.
Chinese Office Action and Translation received in Chinese Application No. 201080009028.1, dated Jul. 3, 2013, 8 pages.
Chinese Office Action and Translation received in Chinese Application No. 201080009028.1, dated Nov. 28, 2012, 12 pages.

* cited by examiner

*Primary Examiner* — William Bashore
*Assistant Examiner* — Henry Orr
(74) *Attorney, Agent, or Firm* — Harrington & Smith

(57) ABSTRACT

An apparatus, that may include a processor configured to receive a touch input associated with a first information item, determine a first set of at least one additional information item associated with said first information item, based at least in part on said touch input, generate a first visual representation based at least in part on said first set, and display said first visual representation is disclosed. A corresponding method and computer-readable medium are also disclosed.

19 Claims, 6 Drawing Sheets

METHOD AND APPARATUS FOR DISPLAYING ADDITIONAL INFORMATION ITEMS

TECHNICAL FIELD

The present application relates generally to displaying additional information items.

BACKGROUND

There has been a recent surge in the use of touch displays on electronic devices. Some of these devices allow a user to view information items on the device. For example a user may view a program, a file, image information, audio information, video information, setting information, a directory, a folder, a playlist, and/or the like.

SUMMARY

Various aspects of examples of the invention are set out in the claims.

According to a first aspect of the present invention, an apparatus, comprising a processor configured to receive a touch input associated with a first information item, determine a first set of at least one additional information item associated with said first information item, based at least in part on said touch input, generate a first visual representation based at least in part on said first set, and provide for display of said first visual representation is disclosed.

According to a second aspect of the present invention, a method, comprising receiving a touch input associated with a first information item, determining a first set of at least one additional information item associated with said first information item, based at least in part on said touch input, generating a first visual representation based at least in part on said first set, and displaying said first visual representation is disclosed.

According to a third aspect of the present invention, a computer program product comprising a computer-readable medium bearing computer program code embodied therein for use with a computer, the computer program code comprising code for providing for receipt of a touch input associated with a first information item, code for determining a first set of at least one additional information item associated with said first information item, based at least in part on said touch input, code for generating a first visual representation based at least in part on said first set, and code for providing for display of said first visual representation is disclosed.

According to a fourth aspect of the present invention, a computer-readable medium encoded with instructions that, when executed by a computer, perform providing for receipt of a touch input associated with a first information item, determining a first set of at least one additional information item associated with said first information item, based at least in part on said touch input, generating a first visual representation based at least in part on said first set, and providing for display of said first visual representation is disclosed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1A:
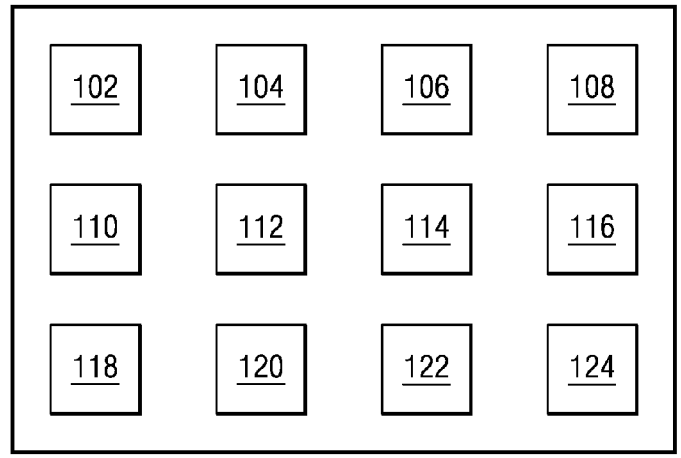
FIGS. 1A-1C are diagrams illustrating a visual representation of information items according to an example embodiment of the invention.

An example embodiment of the present invention and its potential advantages are understood by referring to FIGS. 1 through 7 of the drawings.

In an example embodiment, an apparatus displays a visual representation relating to at least one information item. An information item may relate to a program, a file, image information, audio information, video information, setting information, a directory, a folder, a playlist, and/or the like. For example, an information item may relate to a game. In another example, an information item may relate to a song. In still another example, an information item may relate to a setting for an email account.

A visual representation relating to an information item may comprise graphical information, textual information, video information, and/or the like. For example, a visual representation of an information item may comprise an icon. In another example, a visual representation of an information element may comprise text denoting a program name. In yet another example, a visual representation of an information item may comprise text and an icon.

A visual representation of more than one information item may comprise an arrangement of visual representations of the information items. For example, a visual representation of more than one information item may comprise a one dimensional representation of information items, such as a list, a two dimensional representation, such as a grid, a three dimensional representation, such as a room, and/or the like. For example, a visual representation of more than one information item may represent each information item as text, where text associated with the information items are arranged vertically or horizontally. In another example, a visual representation of more than one information item may represent each information item as an icon, where the icons are arranged vertically and horizontally.

In an example embodiment, an information item may have at least one additional information item associated with it. For example, an information container, such as a directory, a folder, a playlist, a control panel, and/or the like, may be an information item that has associated information items that have a containment relationship with the information container. It should be understood that a containment relationship may be independent of storage topology. For example, a directory may have file information items associated with it based on their containment within the directory. In another example, a playlist may have audio information items associated with it based on their containment relationship with the playlist. In still another example, a control panel may have setting information items associated with it based on their containment relationship with the control panel.

In another example, the information item may have at least one additional information item associated with it based on a non-containment relationship. For example, a program may have information items associated with it representing information that the program uses. In such an example, a media player program may have a playlist information item, an audio information item, a video information item, and/or the like, associated with it.

In an example embodiment, a user may be able to view a visual representation of additional information items associated with an information item. For example, the user may view a visual representation of additional information items having a containment relationship with an information container. The apparatus may display the visual representation of the additional information items in relation to the visual representation of the information item. For example the visual representation of the additional information items may overlay the visual representation of the information item, be adjacent to the visual representation of the information item, and/or the like.

In an example embodiment, a user may be able to control the visual representation of additional information items associated with an information item. For example, a user may perform a drag input, such as input 620 of FIG. 6B, where the contact input, such as contact input 622, relates to the information item. In such an example, the contact input may have a similar position to the visual representation of the information item. The user may be able to control the number of additional information items, the size of the visual representation of the additional information items, and/or the like. For example, the distance of a drag input may determine, at least in part, the number of additional information items to represent. In another example, the distance of the drag input may determine, at least in part, the size of the visual representation of the additional information items. The direction of the movement of the input may vary. For example, the direction of an input movement, such as movement 624 of FIG. 6B, may be vertical, horizontal, diagonal, and/or the like.

In an example embodiment, the position of the visual representation of the additional information items may vary. For example, the position of the visual representation of the additional information items may be adjacent to, on top of, and/or the like, the related information item. In an example embodiment, the position of the visual representation may vary based, at least in part on the position of the visual representation of the information item. For example, if the visual representation of the information item is located at the left side of the display, the visual representation of the additional information items may be to the right of the information item. In another example, if the visual representation of the information item is located at the bottom of the display, the visual representation of the additional information items may be above the information item.

Figure 1B:
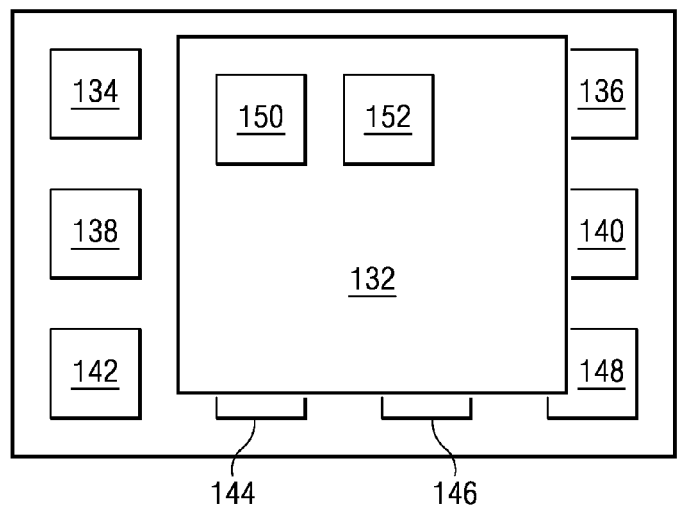
Figure 1C:
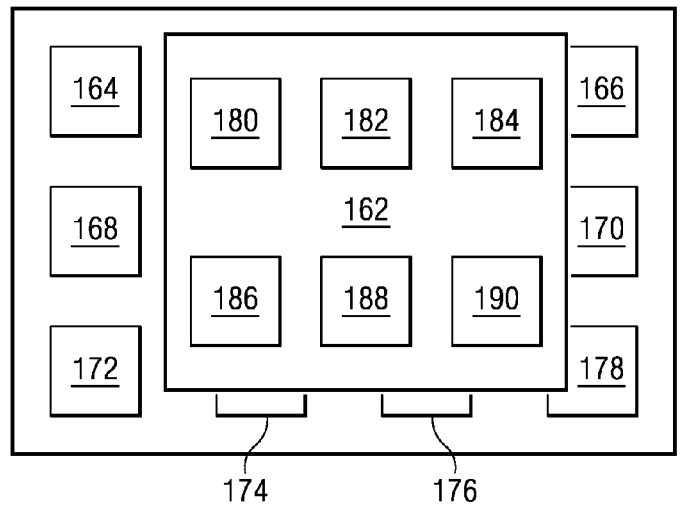

FIGS. 1A-1C are diagrams illustrating a visual representation of information items according to an example embodiment of the invention. Although the examples of FIGS. 1A-1C illustrate a two dimensional grid visual representation, the arrangement of the visual representation may vary across embodiments and do not limit the scope of the invention. Even though the examples of FIGS. 1B-1C illustrate an overlay of the visual representation of the additional information items, the orientation of the visual representation of the additional information items may vary and does not limit the scope of the invention. Furthermore, although the overlay of FIGS. 1B and 1C illustrate a non-transparent overlay, the style of overlay may vary. For example, the overlay may be transparent, semi-transparent, solid, and/or the like.

FIG. 1A is a diagram illustrating a visual representation of information items 100 according to an example embodiment of the invention. Blocks 102-124 each represent a visual representation of an information item.

FIG. 1B is a diagram illustrating a visual representation of information items 130 overlaid with a visual representation of additional information items 132. Blocks 134-148 each relate to a visual representation of an information item. Blocks 150 and 152 relate to visual representations of additional information items. Additional information items of visual representations 150 and 152 may relate to the information item of visual representation 134. For example, information items of visual representations 150 and 152 may be files with a containment relationship to the information item of visual representation 134. In the example of FIG. 1B, the user may have performed a drag input, a continuous stroke input, a multiple touch input, and/or the like, where the distance associated with the input corresponds to a determination to visually represent 2 additional information items associated with the information item of visual representation 134. In such an example, the user may have performed a drag input, for example drag input 620 of FIG. 6B, having a contact input related to the information item of visual representation 134 and a short movement input.

FIG. 1C is a diagram illustrating a visual representation of information items 160 overlaid with a visual representation of additional information items 162. Blocks 164-178 each relate to a visual representation of an information item. Blocks 180-190 relate to visual representations of additional information items. Additional information items of visual representations 180-190 may relate to the information item of 164. For example, information items of visual representations 180-190 may be information items related to information item 164. In the example of FIG. 1C, the user may have performed a drag input, a continuous stroke input, a multiple touch input, and/or the like, where the distance associated with the input corresponds to a determination to visually represent 6 additional information items associated with the information item of visual representation 164. In such an example, the user may have performed a multiple touch input, for example input 680 of FIG. 6E, having contact input related to the information item of visual representation 164 and a long movement input.

Figure 2A:
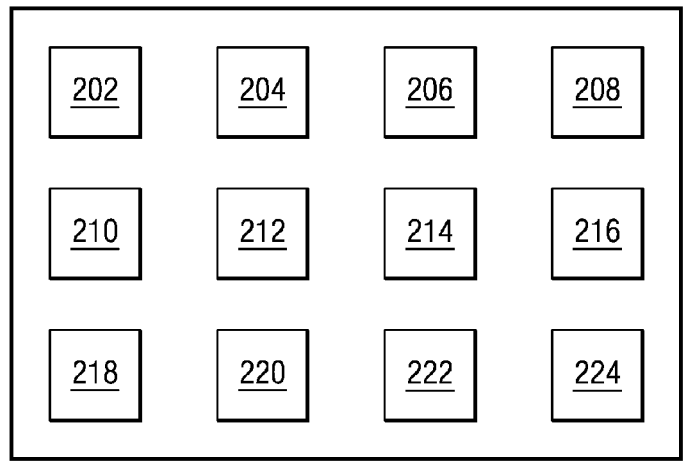
FIGS. 2A-2C are diagrams illustrating a visual representation of information items according to an example embodiment of the invention.
Figure 2B:
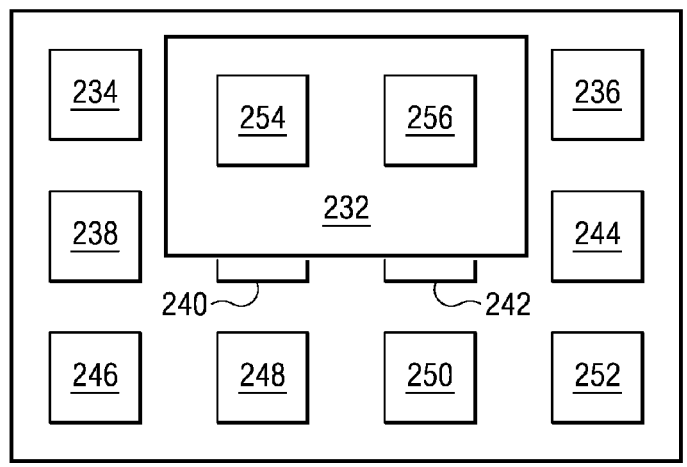
Figure 2C:
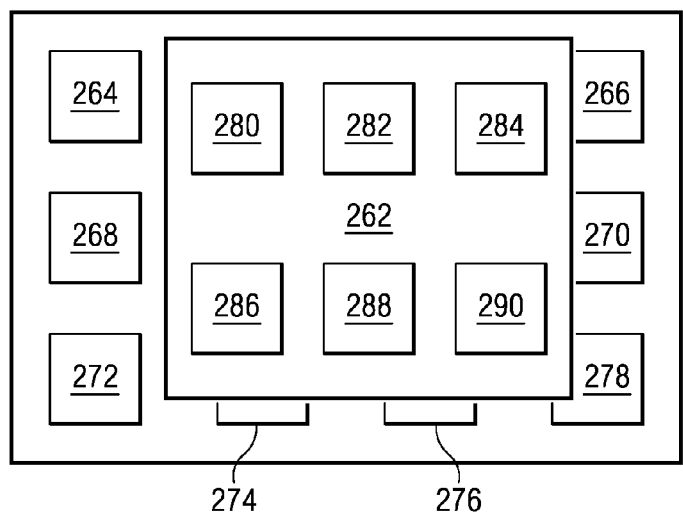

FIGS. 2A-2C are diagrams illustrating a visual representation of information items according to an example embodiment of the invention. Although the examples of FIGS. 2A-2C illustrate a 2 dimensional grid visual representation, the arrangement of the visual representation may vary across embodiments and does not limit the scope of the invention. Even though the examples of FIGS. 2B-2C illustrate an overlay of the visual representation of the additional information items, the orientation of the visual representation of the additional information items may vary and does not limit the scope of the invention. Furthermore, although the overlay of FIGS. 2B and 2C illustrate a non-transparent overlay, the style of overlay may vary. For example, the overlay may be transparent, semi-transparent, solid, and/or the like.

FIG. 2A is a diagram illustrating a visual representation of information items 200 according to an example embodiment of the invention. Blocks 202-224 each represent a visual representation of an information item.

FIG. 2B is a diagram illustrating a visual representation of information items 230 overlaid with a visual representation of additional information items 232. Blocks 234-252 each relate to a visual representation of an information item. Blocks 254 and 256 relate to visual representations of additional information items. Additional information items of visual representations 254 and 256 may relate to the information item of visual representation 234. For example, information items of visual representation 254 and 256 may be files with a containment relationship to the information item of visual representation 234. In the example of FIG. 2B, the user may have performed a drag input, a continuous stroke input, a multiple touch input, and/or the like, where the distance associated with the input corresponds to a determination to visually represent additional information items associated with the information item of visual representation 234, with a visual representation having the size of visual representation 232. In such an example, the user may have performed a drag input, for example input 620 of FIG. 6B, having a contact input related to the information item of visual representation 234 and a short movement input.

FIG. 2C is a diagram illustrating a visual representation of information items 260 overlaid with a visual representation of additional information items 262. Blocks 264-278 each relate to a visual representation of an information item. Blocks 280-290 relate to visual representations of additional information items. Additional information items of visual representation 280-290 may relate to the information item of visual representation 264. For example, information items of visual representation 280-290 may be information items related to the information item of visual representation 264. In the example of FIG. 2C, the user may have performed a drag input, a continuous stroke input, a multiple touch input, and/or the like, where the distance associated with the input corresponds to a determination to visually represent additional information items associated with the information item of visual representation 264, with a visual representation having the size of visual representation 262. In such an example, the user may have performed a multiple touch input, for example input 680 of FIG. 6E, having contact input related to the information item of visual representation 264 and a long movement input.

In an example embodiment, the apparatus may modify the representations of additional information items. For example, the apparatus may reduce the size of the representations of information items, thus showing more information items using less space.

Figure 3:
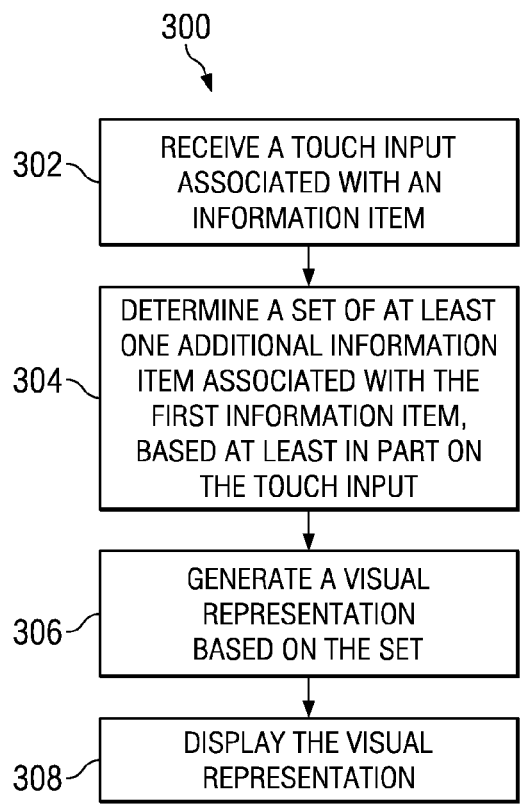
FIG. 3 is a flow diagram showing a method for displaying additional information items according to an example embodiment of the invention.

FIG. 3 is a flow diagram showing a method 300 for displaying additional information items according to an example embodiment of the invention. An apparatus, for example electronic device 10 of FIG. 7, may utilize method 300.

Figure 6A:
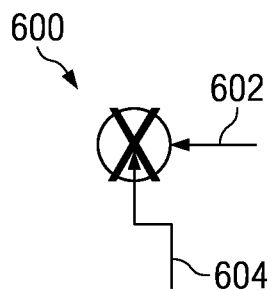
FIGS. 6A-6E are diagrams illustrating input from a touch display according to an example embodiment of the invention.
Figure 6B:
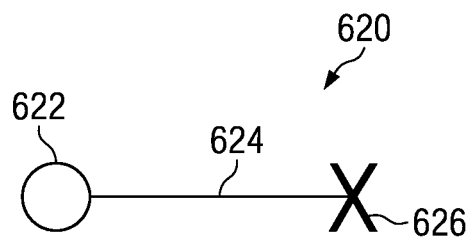
Figure 6C:
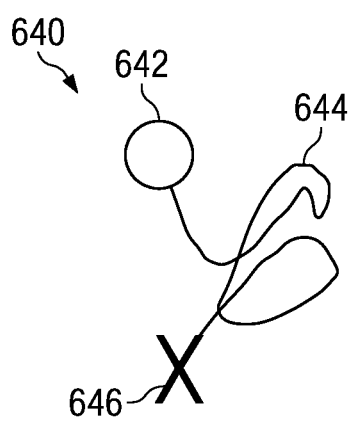

At block 302, the apparatus receives a touch input, for example input 640 of FIG. 6C, associated with an information item. The touch input may comprise position information, time information, speed information, and/or the like. A touch display, for example display 28, of FIG. 7, may receive the continuous stroke input. The apparatus may receive the touch input after the touch input terminates, before the touch input terminates, and/or the like. For example, the apparatus may receive the touch input while a user is performing the touch input. In another example, the apparatus may receive the touch input after the user has terminated a touch input. Termination of a touch input may relate to a release input, for example release input 646 of FIG. 6C, the movement of the touch input intersecting with a region of the display associated with termination, the movement of the touch input intersecting with a display boundary, and/or the like. The position of the touch input may associate the touch input with the information item. For example, a user may perform a drag input, such as input 620 of FIG. 6B, where the position of the contact input, such as contact input 622 relates to the position of the visual representation of the information item, for example visual representation 134 of FIG. 1B.

At block 304, the apparatus determines a set of at least one additional information item associated with the information item, based at least in part on the touch input. The number of additional information items of the set may be based, at least in part, on the distance of the movement of the input, the speed of the movement of the input, and/or the like. For example, a long movement may relate to a set comprising many additional information items. In another example, a short movement may relate to a set comprising few additional information items. The relationship between the information item and the additional information items may be a containment relationship, a usage relationship, and/or the like. For example, an information item may be a control panel, while the additional information items may be settings. In another example, the information item may be a program, and the additional information items may be files used by the program. In such an example, the program may be a word processor, and the files may be documents. The determination of which additional information items to include in the set may be based on the content of the additional information item, usage information associated with the additional information item, and/or the like. For example, the apparatus may determine that the set comprises the most recently used additional information items. In another example, the apparatus may determine that the set comprises the additional information according to a predefined arrangement, such as a user arrangement, default arrangement, and/or the like. In an example embodiment, the apparatus may determine a subset of the set. For example, the apparatus may determine a subset capable of being displayed in a predefined area.

At block 306, the apparatus generates a visual representation, for example visual representation 262 of FIG. 2C, based at least in part on the set. The visual representation of the set may comprise a visual representation of the at least one additional information item. The size of the generated visual representation may be predetermined, may vary in relation to the received input, may vary in relation to the size of the set, and/or the like. For example, the size of the generated visual representation may be a predetermined size regardless of the number of additional information items, such as visual representation 132 of FIG. 1B. In another example, the size of the generated visual representation may be determined by the number of additional information items in the set, such as visual representation 232 of FIG. 2B. The visual representation may comprise an indication of the number of additional information items represented. For example, the visual representation may comprise a ratio representation, such as at least one number, a graph, a bar, and/or the like. The ratio representation may indicate the number of additional information items represented in relation to the number of additional information items associated with the information item.

At block 308, the apparatus displays the generated visual representation. The apparatus may position the display of the visual representation in relation to the position of the visual representation of the information item. For example, the generated visual representation may be adjacent to the visual representation of the information item, such as visual representation 132 associated with the information item of visual representation 134 of FIG. 1B. The apparatus may display the generated visual representation according to various display styles. For example, the apparatus may display the generated visual representation as an overlay, a frame, a window, and/or the like. In another example, if the apparatus displays the generated visual representation as an overlay, the background of the generated visual representation may be semi-transparent so that at least part of the overlain image may be seen.

In an example embodiment, an apparatus may display a visual representation of additional information items as the user performs a touch input. For example, a user may have performed a contact input, such as contact input 622 of FIG. 6B, and be performing a movement input, such as movement input 624 of FIG. 6B. During the movement input, the apparatus may generate the set of additional items based at least in part on the movement input at the time of set generation. For example, if a user is performing movement associated with increasing the number of additional information items in the set, the apparatus may generate a first set with a number of additional information items, and a second set with a larger number of additional information items, after the movement input indicates generating a larger set. In another example, if a user is performing movement associated with decreasing the number of additional information items in the set, the apparatus may generate a first set with a number of additional information items, and a second set with a lesser number of additional information items, after the movement input indicates generating a smaller set. In this manner, the apparatus may vary the visual representation of the set of additional information items displayed in accordance with the ongoing receipt of input.

Figure 4:
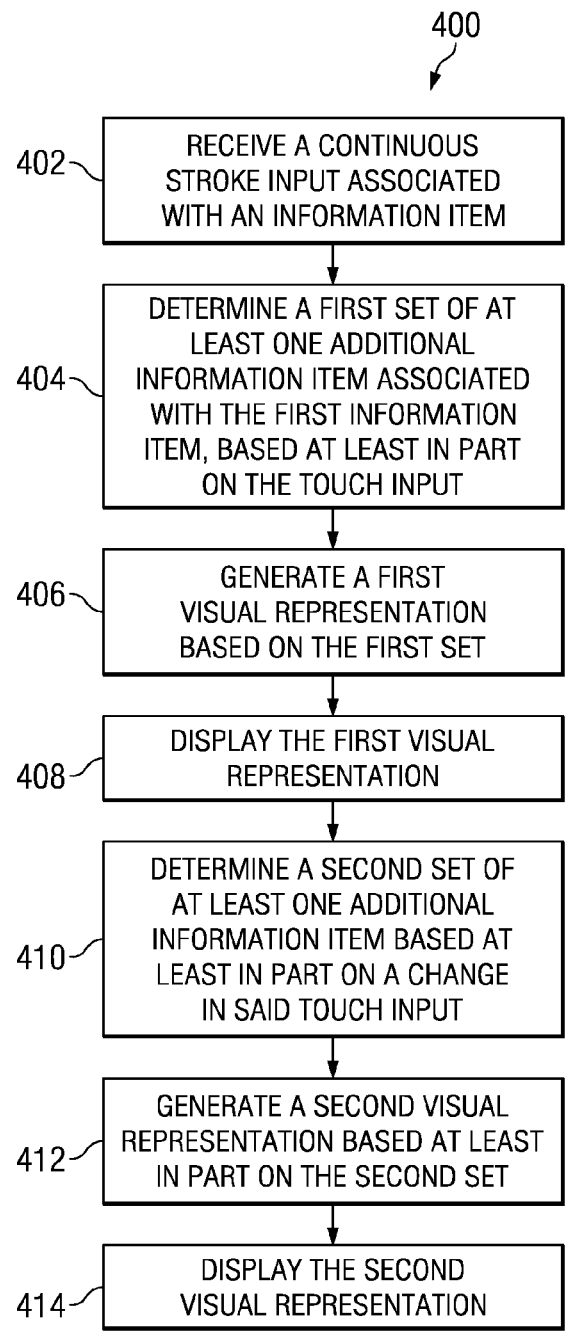
FIG. 4 is a flow diagram showing another method for displaying additional information items according to an example embodiment of the invention.

FIG. 4 is a flow diagram showing another method 400 for displaying additional information items according to an example embodiment of the invention. An apparatus, for example electronic device 10 of FIG. 7, may utilize method 400.

At block 402, the apparatus receives a touch input, for example input 620 of FIG. 6B, associated with an information item. The reception, the input, the association, and the information item are similar as described with reference to block 302 of FIG. 3.

At block 404, the apparatus determines a first set of at least one additional information item associated with the information item, based at least in part on the touch input. The determination, the set, and the additional information item are similar as described with reference to block 304 of FIG. 3.

At block 406, the apparatus generates a first visual representation, for example visual representation 132 of FIG. 1B, based at least in part on the first set. The generation and the visual representation are similar as described with reference to block 306 of FIG. 3.

At block 408, the apparatus displays the first visual representation. The displaying is similar as described with reference to block 308 of FIG. 3.

At block 410, the apparatus determines a second set of at least one additional information item associated with the information item, based at least in part on a change in the touch input. The determination, the set, and the additional information item are similar as described with reference to block 304 of FIG. 3. The change in the touch input may relate to a change in position, time, speed, and/or the like, such as a change in distance from a contact input, such as contact input 622 of FIG. 6B.

At block 412, the apparatus generates a second visual representation, for example visual representation 162 of FIG. 1C, based at least in part on the second set. The generation and the visual representation are similar as described with reference to block 306 of FIG. 3.

At block 414, the apparatus displays the second visual representation. The displaying is similar as described with reference to block 308 of FIG. 3. In an example embodiment, the apparatus terminates the display of the first visual representation when displaying the second visual representation.

In an example embodiment, an apparatus may terminate the display of the visual representation of the set of additional information items. For example, the apparatus may terminate displaying the visual representation of the set when a user selects an additional information item in the set. In such an example, the user may select the additional information item by performing a tap input, a drag input, a release input, and/or the like, in relation to the additional information item. In another example, the apparatus may terminate displaying the set when it receives a release input. In such an example, the apparatus may display the visual representation of the set only while the user is touching the screen. In another example, the apparatus may terminate displaying the visual representation of the set after the elapse of an amount of time. In such an example, the apparatus may terminate displaying the visual representation of the set after 3 seconds. In another example, the apparatus may terminate displaying the visual representation of the set after the user has performed a release input, such as release input 624 of FIG. 6B, and after the elapse of an amount of time. In such an example, the apparatus may terminate displaying the visual representation of the set 3 seconds after the user performs a release input.

Figure 5:
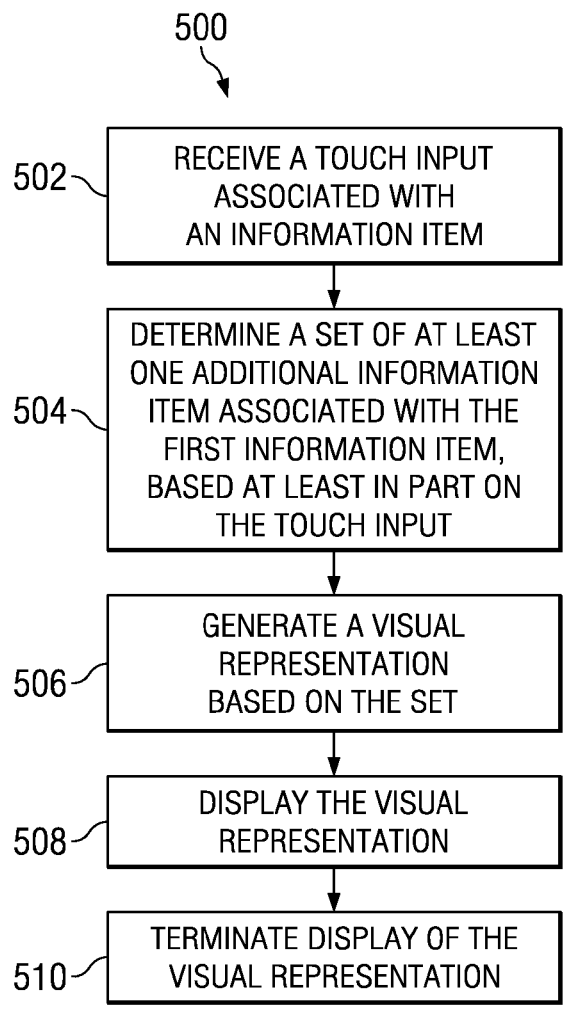
FIG. 5 is a flow diagram showing a still another method for displaying additional information items according to an example embodiment of the invention.

FIG. 5 is a flow diagram showing a still another method 500 for displaying additional information items according to an example embodiment of the invention. An apparatus, for example electronic device 10 of FIG. 7, may utilize method 500.

At block 502, the apparatus receive a touch input, for example input 620 of FIG. 6B, associated with an information item. The reception, the input, the association, and the information item are similar as described with reference to block 302 of FIG. 3.

At block 504, the apparatus determines a set of at least one additional information item associated with the information item, based at least in part on the touch input. The determination, the set, and the additional information item are similar as described with reference to block 304 of FIG. 3.

At block 506, the apparatus generates a visual representation, for example visual representation 232 of FIG. 2B, based at least in part on the set. The generation and the visual representation are similar as described with reference to block 306 of FIG. 3.

At block 508, the apparatus displays the visual representation. The displaying is similar as described with reference to block 308 of FIG. 3.

At block 510, the apparatus terminates displaying the visual representation. The apparatus may terminate the display of the visual representation based, at least in part, on a release input, for example, release input 646 of FIG. 6C, a selection of an additional information item, an elapse of time, and/or the like. The termination of the displaying of the visual representation may comprise removing the visual representation from the display.

Figure 6D:
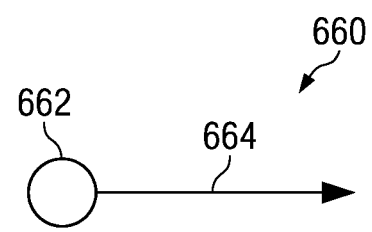
Figure 7:
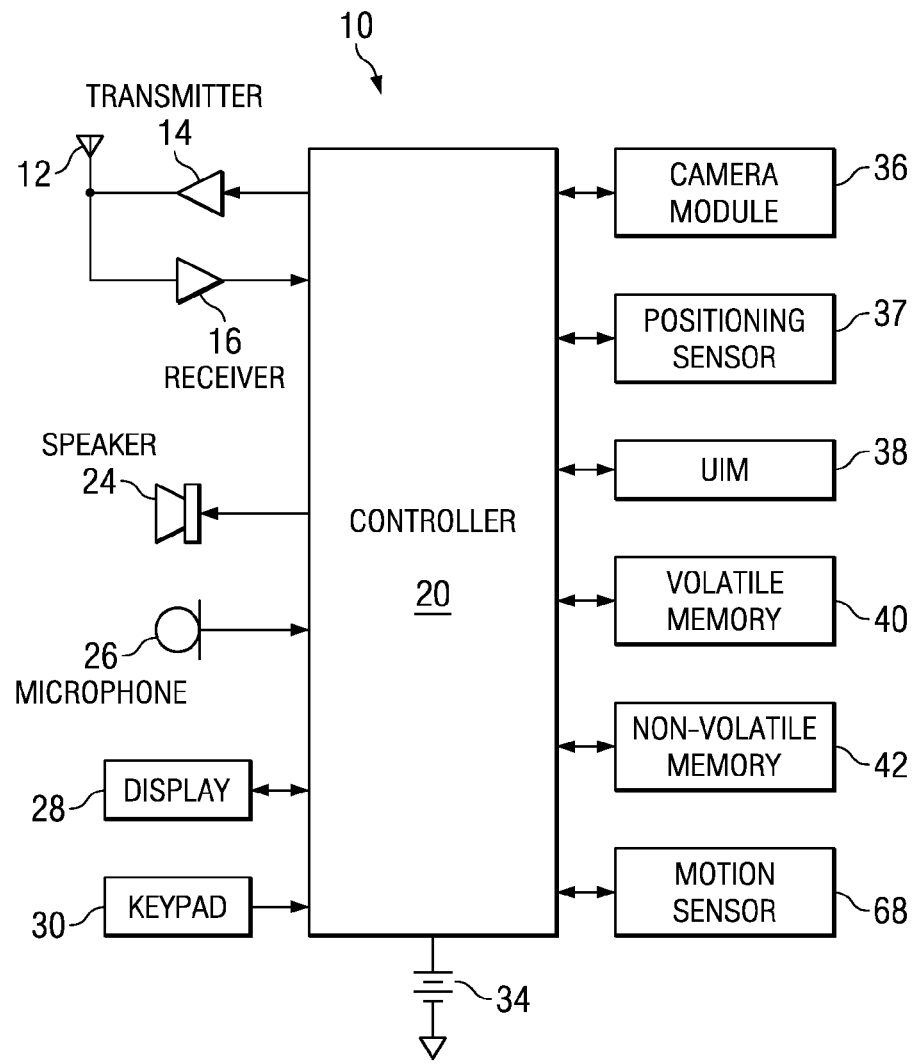
FIG. 7 is a block diagram showing an electronic device according to an example embodiment of the invention.

FIGS. 6A-6D are diagrams illustrating input from a touch display, for example from display 28 of FIG. 7, according to an example embodiment of the invention. In FIGS. 6A-6D, a circle represents an input related to contact with a touch display, two crossed lines represent an input related to releasing a contact from a touch display, and a line represents input related to movement on a touch display.

In the example of FIG. 6A, input 600 relates to receiving contact input 602 and receiving a release input 604. In this example, contact input 602 and release input 604 occur at the same position. In an example embodiment, an apparatus utilizes the time between receiving contact input 602 and release input 604. For example, the apparatus may interpret input 600 as a tap for a short time between contact input 602 and release input 604, as a press for less short time between contact input 602 and release input 604, and/or the like. In such an example, a tap input may induce one operation, such as selecting an item, and a press input may induce another operation, such as performing an operation on an item.

In the example of FIG. 6B, input 620 relates to receiving contact input 622, a movement input 624, and a release input 626. In this example, contact input 622 and release input 626 occur at different positions. Input 620 may relate to dragging an object from one position to another, to moving a scroll bar, to panning a virtual screen, to drawing a shape, and/or the like. In an example embodiment, an apparatus interprets input 620 based at least in part on the speed of movement 624. For example, if input 620 relates to panning a virtual screen, the panning motion may be small for a slow movement, large for a fast movement, and/or the like. In another example embodiment, an apparatus interprets input 620 based at least in part on the distance between contact input 622 and release input 626. For example, if input 620 relates to a scaling operation, such as resizing a box, the scaling may relate to the distance between contact input 622 and release input 626.

In the example of FIG. 6C, input 640 relates to receiving contact input 642, a movement input 644, and a release input 646 are shown. In this example, contact input 642 and release input 646 occur at different positions. Input 640 may relate to dragging an object from one position to another, to moving a scroll bar, to panning a virtual screen, to drawing a shape, and/or the like. In an example embodiment, an apparatus interprets input 640 based at least in part on the speed of movement 644. For example, if input 640 relates to panning a virtual screen, the panning motion may be small for a slow movement, large for a fast movement, and/or the like. In another example embodiment, an apparatus interprets input 640 based at least in part on the distance between contact input 642 and release input 646. For example, if input 640 relates to a scaling operation, such as resizing a box, the scaling may relate to the distance between contact input 642 and release input 646.

In the example of FIG. 6D, input 660 relates to receiving contact input 662, and a movement input 664, where contact is released during movement. Input 660 may relate to dragging an object from one position to another, to moving a scroll bar, to panning a virtual screen, to drawing a shape, and/or the like. In an example embodiment, an apparatus interprets input 660 based at least in part on the speed of movement 664. For example, if input 660 relates to panning a virtual screen, the panning motion may be small for a slow movement, large for a fast movement, and/or the like. In another example embodiment, an apparatus interprets input 660 based at least in part on the distance associated with the movement input 664. For example, if input 660 relates to a scaling operation, such as resizing a box, the scaling may relate to the distance of the movement input 664 from the contact input 662 to the release of contact during movement.

Figure 6E:
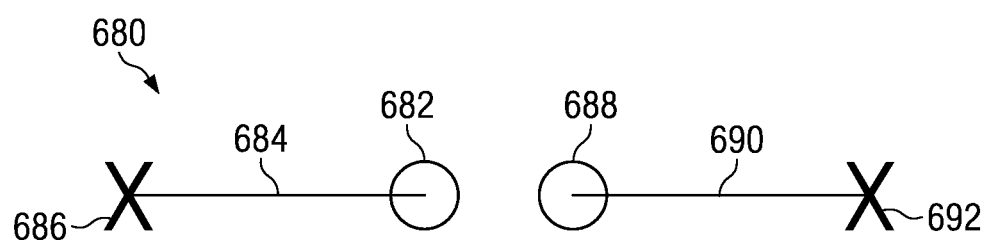

In the example of FIG. 6E, input 680 relates to receiving contact inputs 682 and 688, movement inputs 684 and 690, and release inputs 686 and 692. In this example, contact input 682 and 688, and release input 686 and 692 occur at different positions. Input 680 may be characterized as a multiple touch input. Input 680 may relate to dragging an object from one position to another, to moving a scroll bar, to panning a virtual screen, to drawing a shape, and/or the like. In an example embodiment, an apparatus interprets input 680 based at least in part on the speed of movements 684 and 690. For example, if input 680 relates to zooming a virtual screen, the zooming motion may be small for a slow movement, large for a fast movement, and/or the like. In another example embodiment, an apparatus interprets input 680 based at least in part on the distance between contact inputs 682 and 688 and release inputs 686 and 692. For example, if input 680 relates to a scaling operation, such as resizing a box, the scaling may relate to the collective distance between contact inputs 682 and 688 and release inputs 686 and 692.

FIG. 7 is a block diagram showing an apparatus, such as an electronic device 10, according to an example embodiment of the invention. It should be understood, however, that an electronic device as illustrated and hereinafter described is merely illustrative of an electronic device that could benefit from embodiments of the present invention and, therefore, should not be taken to limit the scope of the present invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, global positioning system (GPS) devices and other types of electronic systems, may readily employ embodiments of the present invention.

Furthermore, devices may readily employ embodiments of the present invention regardless of their intent to provide mobility. In this regard, even though embodiments of the present invention are described in conjunction with mobile communications applications, it should be understood that embodiments of the present invention may be utilized in conjunction with a variety of other applications, both in the mobile communications industries and outside of the mobile communications industries.

The electronic device 10 may comprise an antenna 12 (or multiple antennae) in operable communication with a transmitter 14 and a receiver 16. The electronic device 10 may further comprise a processor 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

Processor 20 may comprise circuitry for implementing audio, video, communication, navigation, logic functions, and or the like. For example, processor 20 may comprise a digital signal processor device, a microprocessor device, various analog to digital converters, digital to analog converters, and other support circuits. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display may determine input based on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may additionally or alternatively comprise an EEPROM, flash memory or the like. The memories may store any of a number of pieces of information, and data. The information and data may be used by the electronic device 10 to implement one or more functions of the electronic device 10, such as the functions described in conjunction with FIGS. 4-6. For example, the memories may comprise an identifier, such as an international mobile equipment identification (IMEI) code, which may uniquely identify the electronic device 10.

Although FIG. 7 illustrates an example of an electronic device that may utilize embodiments of the present invention, it should be understood that the electronic device 10 of FIG. 7 is merely an example device that may utilize embodiments of the present invention.

Without in any way limiting the scope, interpretation, or application of the claims appearing below, a technical effect of one or more of the example embodiments disclosed herein is the conservation of processing resources by permitting a user to specify or otherwise control the number of additional information items to be displayed. As a result of the technical effects offered by this example embodiment, the instances are reduced in which too few additional information items are initially displayed and a user must make further demands of the processing resources by further communicating with the processor and memory to request the display of further additional items. Additionally, as a result of the technical effects offered by this example embodiment, the instances are reduced in which the processor and memory would otherwise initially provide more additional information items than are desired, thereby disadvantageously requiring the expenditure of excessive and unnecessary processing resources.

Embodiments of the present invention may be implemented in software, hardware, application logic or a combination of software, hardware and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising a processor and at least one memory that contains executable instructions that when executed by the processor cause the apparatus to:
   display a visual representation of information items that comprises a first information item;
   receive a continuous stroke input comprising a contact input, a movement input, and a release input, the contact input occurring at a contact input position such that the contact input position corresponds with a position of the first information item and the contact input position is different from a position of the release input;
   determine a first set of at least one additional information item associated with the first information item, wherein number of additional information items of the first set is determined based on a distance between the contact input position and the position of the release input;
   generate a first visual representation based at least in part on the first set; and
   display the first visual representation, such that the first information item is at the contact input position while the first visual representation is at a position that is adjacent to the contact input position and the first visual representation overlays at least part of the visual representation of information items.

2. The apparatus of claim 1, wherein the continuous stroke input relates to a drag input.

3. The apparatus of claim 1, wherein the continuous stroke input relates to a dual touch input.

4. The apparatus of claim 1, wherein the processor is configured to determine the first set based at least in part on a speed associated with the movement input.

5. The apparatus of claim 1, wherein the memory further contains executable instructions that when executed by the processor cause the apparatus to determine the first set based at least in part on usage information associated with the at least one additional information item.

6. The apparatus of claim 1, wherein the first visual representation comprises at least one visual representation of the at least one additional information item.

7. The apparatus of claim 1, wherein the memory further contains executable instructions that when executed by the processor cause the apparatus to:
   determine a second set of the at least one additional information item based at least in part on a change in the touch input, wherein number of additional information items of the second set is determined based on the first set and a change in the movement input;
   generate a second visual representation based at least in part on a parameter defined by the second set; and
   display the second visual representation.

8. The apparatus of claim 1, wherein the first visual representation overlays a second information item.

9. The apparatus of claim 1, wherein the first information item relates to an information container.

10. The apparatus of claim 9, wherein the at least one additional information item has a containment relationship with the information container.

11. The apparatus of claim 9, wherein the at least one additional information item has a containment relationship with the information container.

12. The apparatus of claim 1, wherein the first information item relates to a program.

13. The apparatus of claim 12, wherein the at least one additional information item relates to information utilized by the program.

14. The apparatus of claim 1, wherein the memory further contains executable instructions that when executed by the processor cause the apparatus to terminate display of the first visual representation.

15. The apparatus of claim 14, wherein the continuous stroke input further comprises a release input and the processor is configured to terminate the display at least partially in response to a the release input.

16. The apparatus of claim 14, wherein the memory further contains executable instructions that when executed by the processor cause the apparatus to terminate the display at least partially in response to an elapse of time.

17. The apparatus of claim 14, wherein the memory further contains executable instructions that when executed by the processor cause the apparatus to terminate the display at least partially in response to selection of at least one information item related to the first set.

18. A method, comprising:
    display a visual representation of information items that comprises a first information item;
    receiving a continuous stroke input comprising a contact input, a movement input, and a release input, the contact input occurring at a contact input position such that the contact input position corresponds with a position of the first information item and the contact input position is different from a position of the release input;
    determining a first set of at least one additional information item associated with the first information item, wherein number of additional information items of the first set is determined based on a distance between the contact input position and the position of the release input;
    generating a first visual representation based at least in part on the first set; and
    display the first visual representation, such that the first information item is at the contact input position while the first visual representation is at a position that is adjacent to the contact input position and the first visual representation overlays at least part of the visual representation of information items.

19. A non-transitory computer-readable medium encoded with instructions that, when executed by a computer, perform:
    display a visual representation of information items that comprises a first information item;
    receiving a continuous stroke input comprising a contact input, a movement input, and a release input, the contact input occurring at a contact input position such that the contact input position corresponds with a position of the first information item and the contact input position is different from a position of the release input;
    determining a first set of at least one additional information item associated with the first information item, wherein number of additional information items of the first set is determined based on a distance between the contact input position and the position of the release input;
    generating a first visual representation based at least in part on the first set; and
    display the first visual representation, such that the first information item is at the contact input position and while the first visual representation is at a position that is adjacent to the contact input position and the first visual representation overlays at least part of the visual representation of information items.

\* \* \* \* \*